(12) United States Patent
Goodman et al.

(10) Patent No.: US 6,316,778 B1
(45) Date of Patent: Nov. 13, 2001

(54) REMOVABLE SECURITY BEZEL FOR AN ELECTRONIC DEVICE

(75) Inventors: Gary Goodman; Malcolm Johnston; Simon Chapman, all of Essex (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 7 days.

(21) Appl. No.: 09/609,530

(22) Filed: Jul. 3, 2000

(30) Foreign Application Priority Data

Jul. 8, 2000 (GB) .................................................. 9915868

(51) Int. Cl.$^7$ .............................. G02B 6/00; B60R 27/00
(52) U.S. Cl. ...................... 250/551; 250/221; 250/222.1; 340/425.5; 340/426
(58) Field of Search ................................ 221/221, 222.1, 221/227.11, 227.14, 551; 340/425.5, 426, 555, 815.42; 307/10.2

(56) References Cited

U.S. PATENT DOCUMENTS 4,286,305 * 8/1981 Pilat et al. ............................ 361/172
4,447,123 * 5/1984 Page et al. ............................ 385/115
6,068,627 * 5/2000 Orszulak et al. ...................... 600/34
6,201,234 * 3/2001 Chow et al. .................... 250/214 LS
6,217,182 * 4/2001 Shepherd et al. ....................... 362/23

* cited by examiner

Primary Examiner—Robert H. Kim
Assistant Examiner—Allen C. Ho
(74) Attorney, Agent, or Firm—Larry I. Shelton

(57) ABSTRACT

The invention is a theft deterrent arrangement for a motor vehicle audio apparatus (10) wherein the audio apparatus (10) is enabled when an optoelectronic circuit (7,11,13) is closed by a security bezel (1) removably seated in a recess (3) in a front face (2) of the audio apparatus (10). The security bezel (1) has a light pipe (17), so that when the security bezel (1) is seated in the recess (3), the light pipe (17) provides an optical path (32) between a light detector (13) and an emitter (11) fixedly mounted in the recess (3), thereby closing the optoelectronic circuit (7,11,13) and enabling the audio apparatus (10).

12 Claims, 4 Drawing Sheets

REMOVABLE SECURITY BEZEL FOR AN ELECTRONIC DEVICE

This invention relates to a theft deterrent for an electronic device, in particular for an electronic device in the passenger compartment of a motor vehicle.

Electronic devices fitted into motor vehicle passenger compartments are often stolen. Some electronic devices such as radios have a visible component part necessary for the operation of the device such as a keypad, so that when the device is left unattended the visible component part can be removed, thereby making the device less attractive to thieves. However, such visible component parts can be expensive to produce, and electrical connections between the visible component part and the device may corrode or otherwise deteriorate over time.

It is an object of the invention to provide a more reliable and economic removable visible component in an electronic device for a motor vehicle passenger compartment.

According the invention, there is provided an electronic device, comprising an accessible surface with a recess, a security bezel having a light pipe, the bezel being removably seated in the recess, and a light source and a light detector spaced apart within the recess, so that when the bezel is removed from the recess there is no optical path between the light source and the light detector, and when the bezel is seated in the recess the bezel provides an optical path through the light pipe between the light source and the light detector, wherein the device includes circuitry by which the operation of the electronic device is at least partially disabled when light from the light source does not reach the detector.

Because there need be no electrical contact between the electronic device and the bezel, problems of wear associated with such contacts are alleviated.

For simplicity, the light pipe may be a unitary light pipe, thereby avoiding the need for additional light coupling means at the ends of the light pipe.

Preferably, the bezel is substantially flush with the accessible surface when the bezel is seated in the recess.

The optical path provided by the bezel when it is seated in the recess will guide light from the light source to the detector. A sensor circuit may then sense when light from the light source reaches the light detector and produces a corresponding output signal indicating that the bezel is in the recess.

The output signal from the sensor circuit may be sent to a security circuit that at least partially disables the electronic device when a signal from the sensor circuit indicating that the bezel is seated in the recess is not received. Removing the bezel from the recess will prevent normal use of the electronic device, making it less useful and therefore less attractive to potential thieves.

The electronic device may be an audio device mounted in the instrument panel of a vehicle and the recess may be provided in a front panel of the audio device. To deter thieves, the bezel can be removed from the audio device when the audio device is left unattended in the vehicle.

The bezel may be removed from the vehicle and conveniently be carried in a clothes pocket when not mounted on the electronic device. If the bezel has an elongate pen-like shape, a clip may be provided on the bezel to attach it to a clothes pocket, in a similar fashion to a pen. This will make it easier to carry the bezel.

The light source and detector may respectively emit and detect visible light, but preferably they will emit and detect light in the infra-red part of the spectrum.

To ensure good optical coupling between the light pipe, the light source and the detector, the light pipe may terminate with end faces that respectively lie opposite to the light source and detector when the bezel is seated in the recess.

To prevent the light source from being in use unnecessarily, the device may comprise a sensor to sense when the bezel is seated in the recess so that the light source is only operational when the bezel is seated in the recess.

The light source may produce light of constant intensity, but in one embodiment, the light intensity produced by the light source changes with time according to a predetermined pattern and the sensor circuit only produces an output signal indicating that the bezel is seated in the recess if the light intensity reaching the detector changes with time according to the predetermined cycle. This prevents an unauthorized person from enabling the device by directing a continuous light source towards the detector, and also prevents the device from being enabled by background light.

To provide further deterrence to a potential thief, an additional light source may be provided that produces pulses of visible light when the bezel is not seated in the recess. Preferably, the additional light sources will be fixedly mounted in the recess to draw attention to the absence of the bezel.

The invention will now be described, by way of example, with reference to the accompanying drawings, in which.

Figure 1:
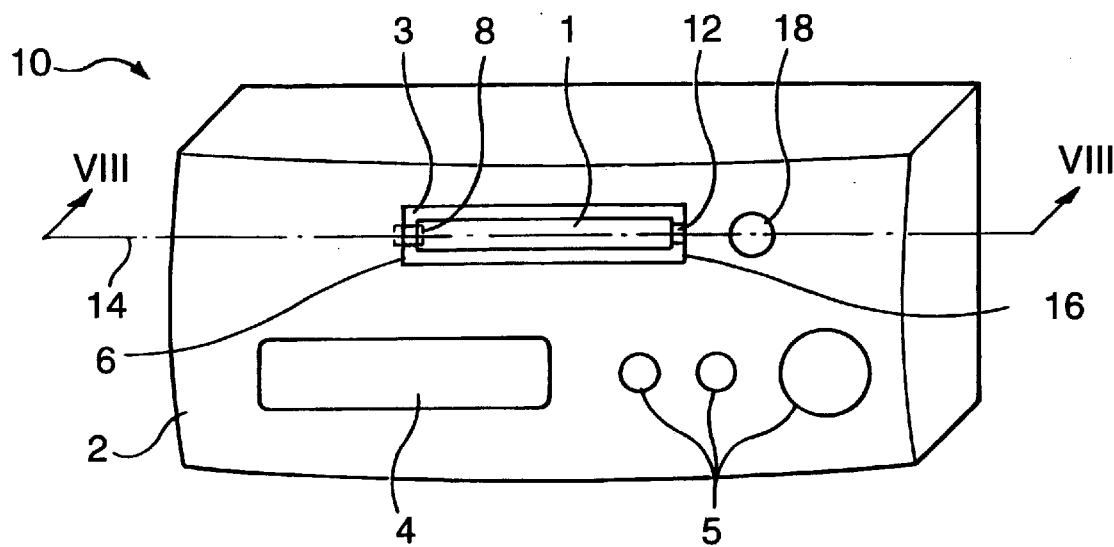
FIG. 1 is a schematic representation of the front face of a car radio with a removable security bezel according to the invention.
Figure 2:
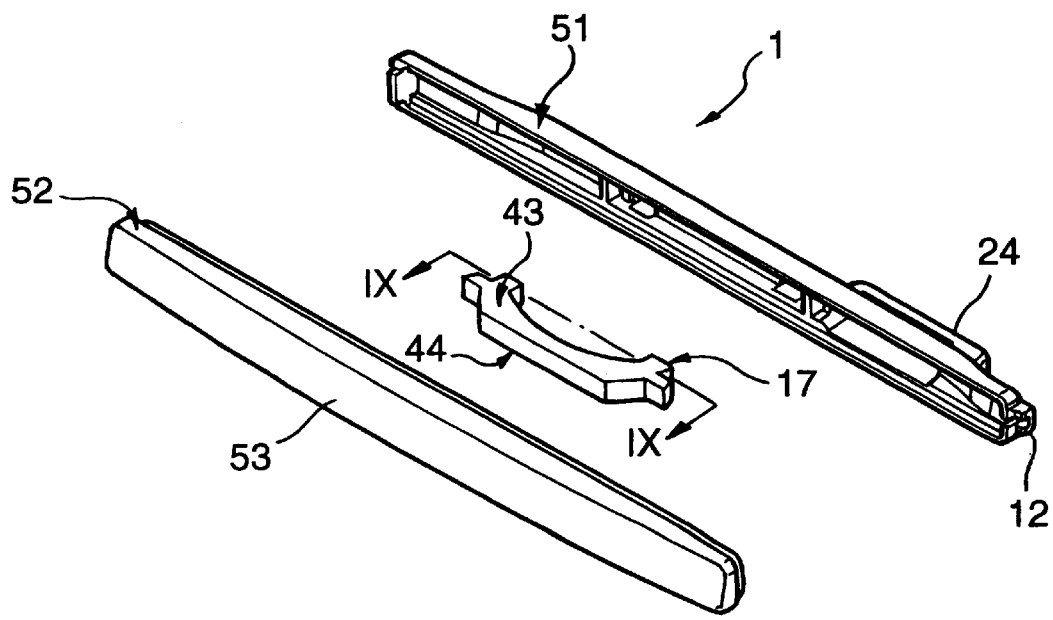
FIG. 2 is an exploded perspective view, to scale, of the removable security bezel of FIG. 1.
Figure 3:
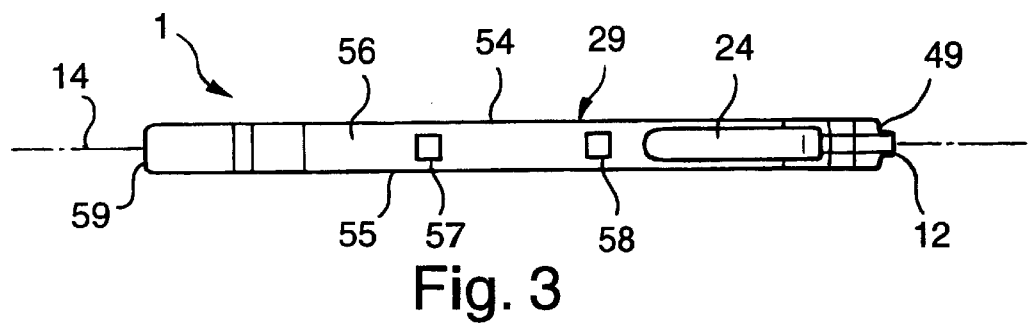
FIGS. 3, 4 and 5 are views of, respectively the back, bottom side and front faces of the removable security bezel of FIG. 2.
Figures 4, 6:
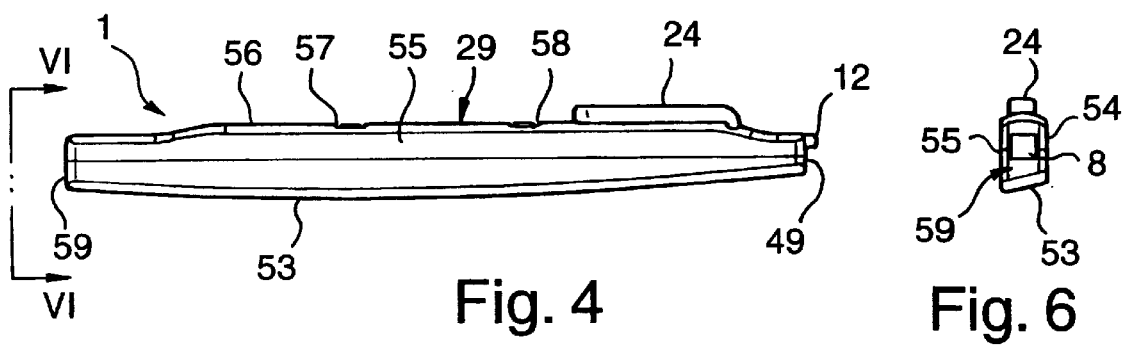
FIG. 6 is an end view of the removable security bezel, taken along line VI—VI of FIG. 4.
Figure 5:
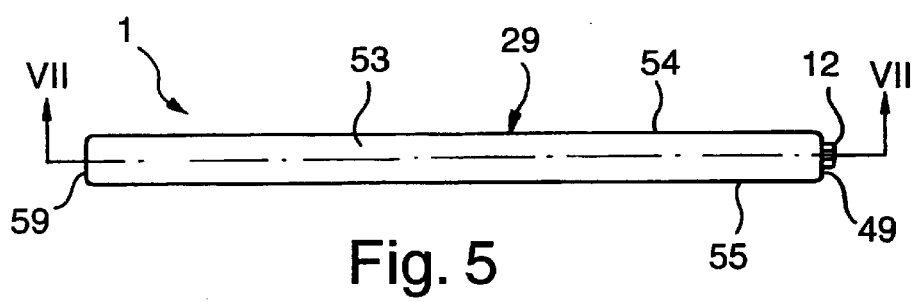
Figure 7:
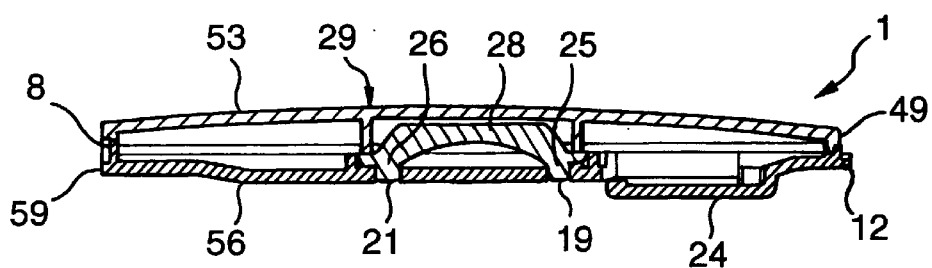
FIG. 7 is a cross-sectional view of the removable security bezel, taken through line VII—VII of FIG. 5.

FIG. 1 shows an electronic device, here a radio or other such audio apparatus 10, for mounting in a dashboard (not shown) of a motor vehicle. The radio 10 has an alphanumeric liquid crystal display 4 and a number of controls 5 in a lower portion of a front face 2. In an upper portion of the front face 2 is an elongate rectangular recess 3 having seated therein a similarly elongate removable security bezel 1.

The construction and form of the removable security bezel can be seen most clearly in FIGS. 2 to 8. The bezel 1 is about 100 mm long, 10 mm deep in the plane of FIGS. 4 and 8, and about 8 mm high in the plane of FIGS. 3 and 5. The bezel is formed from just three components, namely two similarly elongate moulded opaque plastic shells 51,52 that enclose an internal volume in which is housed a clear plastic light pipe 17. The bezel is assembled by inserting the light pipe 17 between the shells 51,52, bringing the shells together, and then ultrasonically welding the shells 51,52 together to form a housing 29 that retains the light pipe 17 inside the removable security bezel 1.

The bezel 1 is essentially square or rectangular in cross-section through an axis 14 along the length of the bezel.

When seated in the recess 3, the housing 29 presents a smoothly curved outer surface 53, flat parallel top and bottom surfaces 54,55, and a gently stepped surface 56 that faces inwards into the recess 3. The stepped surface also has towards one end 49 of the housing an integrally moulded clip 24 that gives the removable security bezel 1 the general appearance of a pen. When removed from the recess, a person may use the clip 24 to clip the bezel 1 to any suitable thin material, such as a shirt pocket, inner jacket pocket, or handbag compartment, in order to retain the bezel 1 more securely.

The end 49 of the bezel housing 29 nearest the clip 24 also has a projection 12 that extends about 2 mm from the housing inner surface 56 along the bezel axis 14. The other end 59 of the bezel housing 29 has a square cross-section depression about 1 mm deep.

The housing presents no openings except two square apertures 57,58 on the housing inner surface 56. The light pipe 17 has a pair of parallel side walls 43,44 that extend either side of the bezel longitudinal axis 14. A central portion 28 of the light pipe extends along the bezel longitudinal axis 14 and has a varying rectangular cross-section normal the bezel axis. The central portion 28 is bounded by two legs 25,26 that extend transverse to the bezel axis 14 towards the housing apertures 57,58. The light pipe legs 25,26 terminate in smooth flat end faces 19,21. When the bezel 1 is assembled, the light pipe end faces 19,21 are flush with the edges of the apertures 57,58 in the housing inner surface 56.

It should be noted that because the clip 24 extends from the same side of the bezel 1 having the light pipe end faces 19,21, that is the bezel inner surface 56. If the bezel is placed with the bezel inner surface 56 towards a flat surface, such as a desktop, then the clip 24 will hold the light pipe end faces 19,21 off the surface. The clip 24 therefore helps to protect the light pipe end faces 19,21 from being scratched when the bezel in placed on a flat surface.

Figure 8:
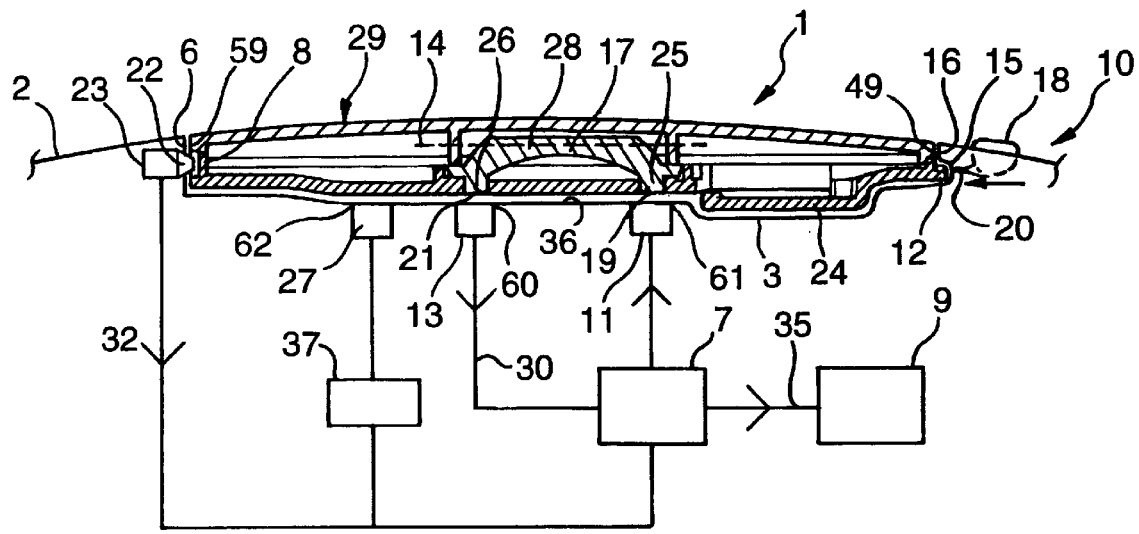
FIG. 8 is a cross sectional view along the line VIII—VIII in FIG. 1, showing the removable security bezel and a schematic representation of an optoelectronic sensor circuit and a security circuit.

As can be seen most clearly in FIG. 8, the security bezel 1 is retained at one end 6 of the recess 3 by a retention feature 22 that projects into the depression 8 in the end 59 of the bezel 1. From the other end 16 of the recess 3, the bezel 1 is retained by the bezel end protrusion 12 that engages with a matching catch 15 at that end 16 of the recess 3. Both the retention feature 22 and bezel protrusion 12 extend approximately along the longitudinal axis 14 of the bezel 1.

A button 18 on the radio front face 2 when pressed activates a mechanism 20 which moves the bezel to the left as illustrated against the retention feature 22, which is movable parallel to the bezel axis 14 and which is spring loaded to the right as drawn in FIG. 8. When the bezel 1 is shifted to the left of FIG. 8, the protrusion 12 is disengaged from the catch 15 to allow the bezel 1 to be pivoted out of the recess 3.

When the removable security bezel 1 is seated in the recess 3, the housing inner surface 56 faces against a base surface 36 of the recess 3 that is roughly parallel to the front face 2 of the radio 10. The recess base surface 36 has three apertures 60,61,62 in which are held an infra-red light emitting diode (LED) 11, an optical detector, here an infra-red phototransistor 13 matched to the infra-red LED 11, and a visible light emitting diode (LED) 27.

One light pipe end face 19 is opposite the infra-red LED 11, and the other light pipe end face 21 is opposite the matched infra-red phototransistor 13. The matched LED 11 and phototransistor 13 are fixedly mounted flush with the base surface 36 of the recess 3.

When the removable bezel 1 is seated in the recess 3 an electronic microswitch 23 is closed by leftward movement of the sprung retention feature 22. This sends a signal 32, which then activates an electronic sensor circuit 7. The circuit 7 controls both the infra-red LED 11 and optical detector 13. When the bezel 1 is initially seated in the recess 3, the electronic sensor circuit 7 activates the light emitter 11 for a short period of time, for example pulsing the infra-red LED 11 at a frequency of several kilohertz for five seconds. If the bezel 1 is correctly seated in the recess, rays of infra-red light are guided by the light pipe 17 towards the phototransistor 13. The phototransistor 13 then sends a signal 30 to the sensor circuit 7 which passes an activation signal 35 to a microprocessor 9, which then enables the radio 10.

Therefore, when the removable security bezel 1 is seated in the recess 3 as shown in FIG. 1, the radio 10 can be operated normally. However, when the bezel 1 is removed, the electronic sensor circuit 7 passes no activation signal to the microprocessor 9, with the result that operation of the radio 10 is disabled.

The infra-red LED 11 and the optical detector 13 face away from the recess 3 in an outward direction to ensure that light from the infra-red LED 11 will not reach the phototransistor 13 directly, so that if the microswitch 23 is closed but the bezel 1 is not present in the recess 3, no activation signal 35 will be registered by the microprocessor 9 and the radio 10 will remain in a disabled state.

To indicate to a potential thief that the radio 10 is disabled, the visible red LED 27 is linked to a driver circuit 37 controlled by the microswitch 23 so that the visible LED 27 flashes only when the removable security bezel 1 is not in place.

Figure 9:
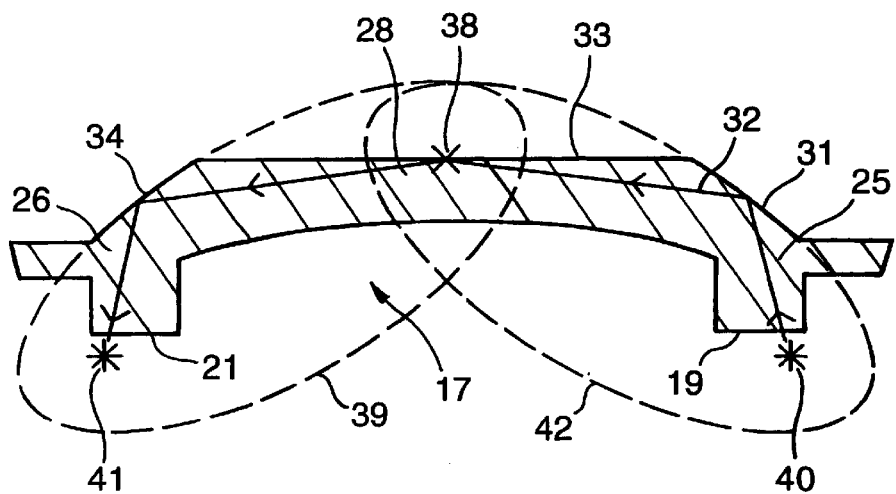
FIG. 9 is a cross sectional diagram of the light pipe as viewed along IX—IX of FIG. 2.

The diagram of FIG. 9 shows the light pipe 17 to scale and how light entering the light pipe 17 through one end face 19 can be guided along an optical path 32 by internal reflections off top faces 31, 33 and 34 of the light pipe 17 so that the light finally leaves though the other end face 21. The middle top face 33 along the light pipe central portion 28 is flat, and the adjacent top faces 31,34 are convexly curved.

Light travelling at an angle to the cross sectional plane of FIG. 9 will also be guided by the planar parallel side walls 43,44 of the light pipe 17, which extend in a plane perpendicular to the recess base 36 when the bezel 1 is in place as indicated in FIG. 8.

The light pipe curved top faces 31 and 34 lie directly opposite the respective end faces 19 and 21, the curvature of each face 31 and 34 being such that each face 31,34 describes part of an elliptical surface 39,42 shown in FIG. 9 by dashed lines.

The elliptical surfaces 39,42 have a first focus 38 in common, as shown by a cross, coincident with the flat top face 3, and a second focus 40,41 outside the light pipe 17, shown by asterisks, one of which 40 is near one light pipe end surface 19 and the other of which 41 is near the other light pipe end surface 21. The curvature of the top faces 31 and 34 is such that when the bezel 1 is in place, the second focus 40,41 of each respective ellipse 39,42 is close to the active area of either the infra-red LED 11 or the phototransistor 13.

This arrangement reduces the number of internal reflections a light ray 32 will undergo when travelling through the light pipe 17 and helps to focus light from the infra-red LED 11 onto the phototransistor 13, thereby improving the efficiency of the light pipe 17 without the need for lenses at the ends of the light pipe.

The opaque bezel housing 29 helps to prevent ambient light entering the light pipe 17 or otherwise interfering with the electronic sensor circuit 7.

Figure 10:
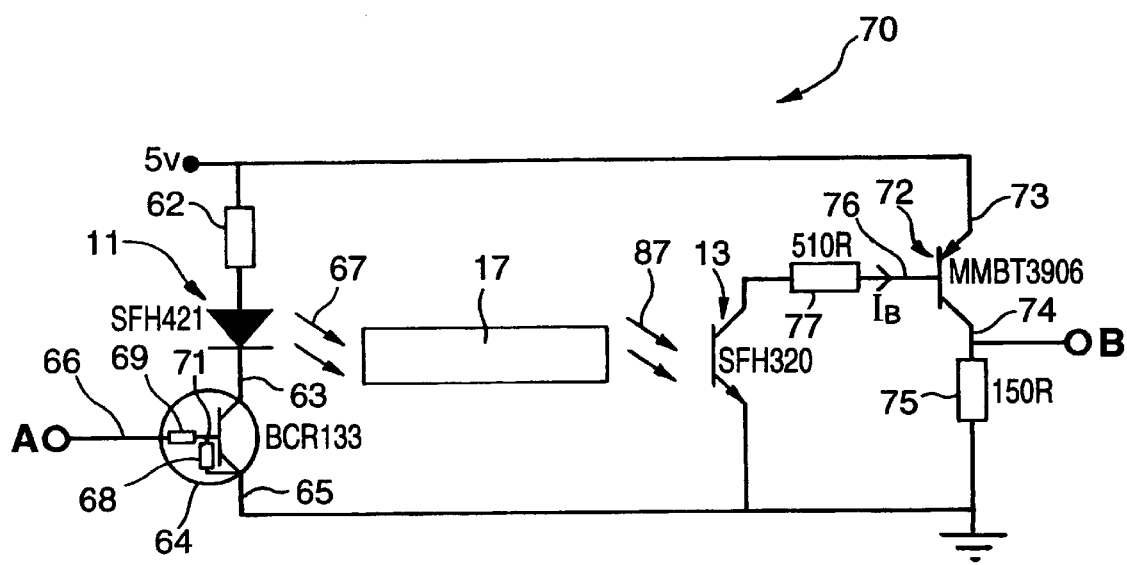
FIG. 10 is a circuit diagram for the optoelectronic sensor circuit of FIG. 8.

A circuit diagram of the optoelectronic circuit described above is shown in FIG. 10, and indicated generally by reference numeral 70. The optoelectronic circuit 70 includes the sensor circuit 7, optical light pipe 17, and infra-red LED 11 and photodetector 13 shown in FIG. 8. When the light pipe 17 is in the recess 3, the infra-red LED 11, of the type SFH421, emits infra-red light 67 at a wavelength of 840 nm ±40 nm that is guided and then emitted 87 by the light pipe 17 to reach the phototransistor 13, of the npn type SFH320, adapted to detect infra-red radiation in the wavelength range produced by the LED 11.

The infra-red LED 11 is connected at one terminal to a 5V supply rail via a 75Ω resistor 62 and at the other terminal to the collector terminal 63 of an npn bipolar transistor 64, of the type BRC133. The emitter terminal 65 of the transistor 64 is grounded so that when the transistor 64 is biased into conduction at the base terminal 66 by applying a voltage at a circuit input "A", the infra-red LED 11 becomes forward biased and emits infra-red light 67.

The transistor 64 has an integral potential divider formed by a first resistor 68 between a base region 71 and the emitter terminal 65, and a second resistor 69 between the base terminal 66 and the base region 71.

The detector stage of the sensor circuit 7 comprises a pnp transistor 72, of the type MMBT3906, whose base current $I_B$ is controlled by the phototransistor 13.

The emitter 73 of the transistor 72 is held at 5V, the collector terminal 74 is connected to ground via a 150Ω resistor 75, and the base terminal 76 is connected to ground via the phototransistor 13 in series with a 510Ω resistor 77.

In the dark, the phototransistor 13 does not conduct and so transistor 72 is switched off. A circuit output "B", connected to the collector terminal 74 of the transistor 72 and to ground via the 150Ω resistor 75, and is therefore low, giving a null signal that is passed to the microprocessor 9, which interprets this as a lack of an activation signal 35.

However, when infra-red light from the infra-red LED 11 reaches 87 the phototransistor 13, the reverse biased base-emitter junction of the phototransistor 13 conducts and the voltage at the base of the transistor 72 drops, which biases the transistor 72 into conduction and makes the output voltage high at output "B". The high output signal at "B" is passed to the microprocessor 9, which then enables the radio 10.

To prevent someone enabling the radio 10 without the removable security bezel 1 in place, the light intensity emitted at the infra-red LED 11 is modulated by time dependent voltage code applied at circuit input "A" at the base of the transistor 64 controlling the current through the infra-red LED 11. The optoelectronic circuit 70 then only enables the radio 10 if the correct code is received from the sensor circuit output "B", with the result that a steady infra-red light source cannot enable the radio 10.

It will therefore be apparent from the above description that this invention can be used to deter effectively thieves from stealing electronic equipment from the passenger compartment of a motor vehicle and provides many advantages.

Although the above features and advantages are described with reference to a vehicle radio, they apply to electronic devices generally.

What is claimed is:

1. An electronic device comprising:
   an accessible surface with a recess;
   a security bezel having a light pipe, said security bezel being removably seated in said recess;
   a light source;
   a light detector, wherein said light source and said light detector are spaced apart within said recess, so that when said security bezel is removed from said recess there is no optical path between said light source and said light detector, and when said security bezel is seated in said recess said security bezel provides an optical path through said light pipe between said light source and said light detector; and
   circuitry for at least partially disabling said electronic device when light from said light source does not reach said light detector.

2. The electronic device of claim 1, wherein said light pipe is a unitary light pipe.

3. The electronic device of claim 1, wherein said security bezel is substantially flush with said accessible surface when said security bezel is seated in said recess.

4. The electronic device of claim 1, wherein a sensor circuit senses when light from said light source reaches said light detector and produces a corresponding output signal indicating that said security bezel is seated in said recess.

5. The electronic device of claim 4, wherein said output signal from said sensor circuit is sent to a security circuit that at least partially disables said electronic device when a signal from said sensor circuit to indicate that said security bezel is seated in said recess is not received.

6. The electronic device of claim 1, wherein said bezel has an elongate pen-like shape and a clip is provided on said security bezel.

7. The electronic device of claim 6, wherein said light pipe terminations have one or more end faces, and wherein a clip is arranged to protect each end face when said security bezel is placed on a flat surface.

8. The electronic device of claim 1, wherein said light source and said light detector respectively emit and detect light in the infra-red part of the spectrum.

9. The electronic device of claim 1, wherein said light pipe terminates with end faces that respectively lie opposite to said light source and said light detector when said bezel is seated in said recess.

10. The electronic device of claim 1 further comprising a sensor to sense when said bezel is seated in said recess so that said light source is only operational when said bezel is seated in said recess.

11. The electronic device of claim 10, wherein a light intensity produced by said light source changes with time according to a predetermined pattern and wherein said sensor circuit only produces an output signal indicating that said security bezel is seated in said recess if said light intensity reaching said detector changes with time according to the predetermined pattern.

12. The electronic device of claim 1, wherein an additional light source is provided that produces pulses of visible light when said security bezel is not seated in said recess.

* * * * *